United States Patent [19]

Tanaka et al.

[11] 4,130,510
[45] Dec. 19, 1978

[54] CURING OF EPOXY RESIN SYSTEMS USING HALFESTER COMPOUNDS CONTAINING ALIPHATIC TERTIARY AMINO GROUPS

[75] Inventors: Goro Tanaka; Hiroshi Suzuki, both of Hitachi, Japan

[73] Assignees: Hitachi Chemical Co., Ltd.; Hitachi, Ltd., both of Japan

[21] Appl. No.: 787,488

[22] Filed: Apr. 14, 1977

[30] Foreign Application Priority Data

Apr. 14, 1976 [JP] Japan .................................. 51/41363

[51] Int. Cl.$^2$ .............................................. C08L 63/00
[52] U.S. Cl. .................................................. 260/823
[58] Field of Search ............................ 260/2 N, 47 EN

[56] References Cited

U.S. PATENT DOCUMENTS

| 3,419,525 | 12/1968 | Aelong | 260/47 EN |
| 3,497,524 | 2/1970 | Payne et al. | 260/2 N |
| 3,627,704 | 12/1971 | Moran et al. | 260/2 N |
| 3,963,796 | 6/1976 | Yokono et al. | 260/47 EN |

Primary Examiner—M. J. Welsh
Attorney, Agent, or Firm—Craig & Antonelli

[57] ABSTRACT

Half-ester compounds obtained by reacting polycarboxylic acid anhydrides with aliphatic tertiary amino alcohols have excellent latent characteristics as a curing catalyst for epoxy resins which are normally catalyzed by tertiary amines. When epoxy resin compositions containing the half-ester compounds are applied to semiconductor devices, remarkably small leakage currents of the devices are observed.

34 Claims, No Drawings

CURING OF EPOXY RESIN SYSTEMS USING HALFESTER COMPOUNDS CONTAINING ALIPHATIC TERTIARY AMINO GROUPS

BACKGROUND OF THE INVENTION

The present invention is concerned with the improvement in the curing of epoxy resin systems which have heretofore been catalyzed by tertiary amines, and more specifically to new epoxy resin systems which contain a half-ester compound as a latent catalyst.

Aliphatic tertiary amines, quaternary ammonium salts and organic metal salts have conventionally been used as curing catalysts for epoxy resins. However, as is well known in the art, these curing catalysts shorten the shelf life of the epoxy resin systems. Accordingly, so-called latent curing catalysts that are very stable at temperatures approximating room temperature without causing the shortening of the shelf life but rapidly cure the epoxy resins under heating have been proposed and used advantageously in the art. As typical instances of such latent curing catalysts, there can be mentioned products formed by converting tertiary amines to salts by boron trifluoride, a carboxylic acid or an onium compound, and compounds containing a basic nitrogen atom and a carboxyl group. In fact, these catalysts are considerably improved in the latent curing property. A Japanese Laid-open Publication No. 10399 of 1975 (claiming priority of U.S. application S.N. 352201, filed Apr. 18, 1973) discloses salts of polycarboxylic acid anhydride with imidazole compounds. The salts are used for epoxy resins as a curing agent.

A U.S. Pat. 3,497,524 also discloses various salts obtained from tertiary amines and halides of phthalic acid. In these days, a higher latent curing property is demanded. Cured epoxy resins obtained by using conventional curing catalysts have been found defective because an undesirably large amount of a leak current is generated when the epoxy resin composition is applied to semiconductor devices.

SUMMARY OF THE INVENTION

It is therefore an object of the present invention to provide the improvement in the curing of epoxy resin systems which are catalyzed by a new latent curing catalyst.

The curing catalyst for epoxy resins employed in the present invention is considered a mixture of half-esters which contain an ester conjunction, i.e., an ester group, terminated by an aliphatic tertiary amino group and contain a carboxyl group which forms a thermally separable intramolecular salt with the aliphatic tertiary amino group, said ester conjunction (ester group) and said carboxyl group being directly connected to a polyvalent group. Further, the half-ester compound can be one which contains and ester conjunction terminated by an aliphatic tertiary amino group and a carboxyl group which forms a thermally separable intramolecular salt with the amino group and contains another carboxyl group which forms a thermally separable salt with an aliphatic tertiary amine, said ester conjunction and said carboxyl groups being directly connected to a polyvalent group.

DETAILED DESCRIPTION OF THE INVENTION

In the present invention the latent catalyst is considered a mixture of half-ester compounds which contain an ester conjunction (ester group) terminated by an aliphatic tertiary amino group and a carboxyl group which forms an intramolecular salt with the amino group, the ester conjunction (ester group) and the carboxyl group being directly connected to an aliphatic or aromatic polyvalent group.

The half-ester is prepared by, for example, reacting a polycarboxylic acid anhydride with a tertiary amino alcohol in the presence of or absence of water. Since the resulting product is considered a mixture of esterificated products, a chemical structure thereof can not be shown. It is a matter of course that a pure single half-ester compound defined by the accompanying claim or claims can be used by separating the pure half-ester compound from the mixture. However, such purified single half-ester compound tends to be expensive. According to the experiments of the invention, the mixture of half-ester compounds showed satisfactory latent characteristics as a curing catalyst.

The main component of the mixture may be represented by the following general formula:

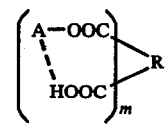

[I]

wherein R is an aliphatic or aromatic polyvalent group of two to six valences, A is an aliphatic monovalent group containing an aliphatic tertiary amino group, and m is an integer of 1 to 3.

By the term "half-ester" is meant a mixture of compounds having an ester conjunction (ester group) terminated by an aliphatic tertiary amino group and a carboxyl group which forms an intramolecular salt with the amino group.

By virtue of the above half ester structure, the nitrogen atom in the aliphatic tertiary amino group and carboxyl group in the above formula are allowed to form a salt in the molecule, and hence, the curing catalyst of the present invention exerts excellent effects over conventional curing catalysts with respect to the latent property. It was also found that when the epoxy resin systems containing the half-esters are applied to semiconductor devices, the cured resins of the systems generated a remarkably small leakage current in the devices. In connection with this, a known compound of the type having a carboxyl group directly bonded to a pyridine ring, which readily forms an intermolecular salt between the carboxyl group and nitrogen atom but hardly forms an intramolecular salt, is insufficient in the latent curing property.

The half-ester compounds used in the invention can have the following characteristics. That is, the compounds contain an ester conjunction (ester group ) terminated by an aliphatic tertiary amino group and a carboxylic group which forms an intramolecular salt with the aliphatic tertiary amino group, the ester conjunction (ester group) and the carboxyl group being directly connected to an aliphatic or aromatic polyvalent group, and contains another carboxyl group which forms a salt with an aliphatic amine.

The main component of the mixture of the half-ester mentioned above is represented by the general formula:

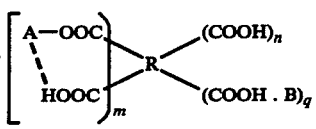  [II]

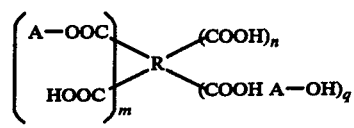  [III]

wherein R is an aliphatic or aromatic group of two to six valences, A is an aliphatic monovalent group containing an aliphatic tertiary amino group, B is an aliphatic amine, m is an integer of 1 to 3, and n and q are integers of zero to 4.

"B" in the above formula includes an aliphatic tertiary amino alcohol or an aliphatic tertiary amine.

The formulae [I] and [II], the integers m, n and q can be any values within the ranges defined hereinabove, but the sum of them is no more than 6.

In the above general formula, structues $R (COOH)_n$ and $R (COOH.B)_q$ are not essentially indispensable. More specifically, the structure $R (COOH)_n$ has an effect of reducing the presence of a free tertiary amine but it may degrade the curing promoting property of the catalyst. Half-ester compounds having a structure of $R (COOH.B)_q$ is inferior to the half-ester shown by formula [I] with respect to such properties as the latent curing property. Practically, half ester compounds shown by formula [II] can be used, however.

The synthesis of half-ester compounds will now be described, while processes of preparing the half-ester compounds are not limited to the following. There is a process in which an ester exchange reaction is carried out between a half ester of a carboxylic acid and an aliphatic tertiary amino alcohol represented by A-OH or a process in which a half ester is prepared by reacting a polycarboxylic anhydride with the tertiary amino alcohol. The latter process is preferred and economical because of one step process.

According to this latter process, a reaction between an acid anhydride and an alcohol takes place. The intended product can easily be obtained by, for example, reacting the two components at a reaction temperature of 80 to 100° C. for several hours. This synthetic process will now be described more specifically.

Synthesis of compounds of the above formula [I] is first described.

Compounds of the formula [I] can be prepared, for example, by reacting an alcohol A-OH having a nitrogen atom of the aliphatic tertiary amine type with a polycarboxylic acid anhydride represented by the following formula:

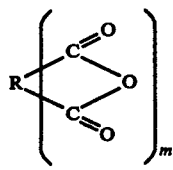

Synthesis of compounds of the general formula (II) wherein either n or q is not O and the aliphatic tertiary amine B is the same as A-OH, namely synthesis of compounds represented by the following general formula: is now described.

Compounds of the formula [III] can be prepared by reacting an alcohol A-OH with a carboxylic acid anhydride represented by the following formula:

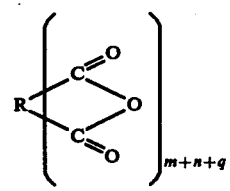

in the presence of water or by reacting an alcohol A-OH with a carboxylic acid anhydride having a free carboxyl group represented by the following formula:

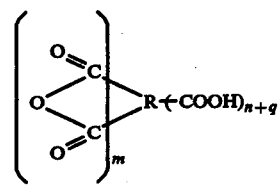

Next, synthesis of compounds of the formula [II] in which either n or q is not O and the aliphatic tertiary amine B is not the same as A-OH, namely synthesis of compounds represented by the following general formula:

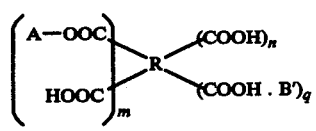  [IV]

is described.

Compounds of the formula [IV] can be prepared by reacting A-OH and B' with a carboxylic acid anhydride in the presence of water as in synthesis of compounds of the formula [III] or reacting A-OH and B' with a carboxylic acid anhydride containing a free carboxyl group. A-OH and B' may be simultaneously added to the reaction system, or they may be added separately while staggering the time for addition. As is well known in the art, B' and the free carboxyl group form a salt, and although the above-mentioned esterification reaction is conducted for several hours under heating, this salt-forming reaction can take place even at room temperature.

Another type of half-ester compounds employed in the present invention is represented by the formula [V]:

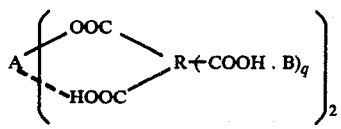

wherein A is an aliphatic bivalent group containing an aliphatic tertiary amino group, and B is an aliphatic tertiary amino alcohol or an aliphatic tertiary amine forming an intermolecular salt with a carboxyl group. Preferably, the aromatic polycarboxylic acid anhydrides and aliphatic polycarboxylic acid anhydrides should have molecular weights of 148 to about 400 and 61 to about 250, respctively.

As specific examples of acid anhydrides to be used for the synthesis of half-ester compounds, there are maleic acid anhydride, phthalic acid anhydride, tetrahydrophthalic acid anhydride, hexahydrophthalic acid anhydride, endomethylenetetrahydrophthalic acid anhydride, tetrachlorophthalic acid anhydride, endodichloromethylenetetrachlorophthalic acid anhydride, tetrabromophthalic acid anhydride, trimellitic acid anhydride, pyromellitic acid dianhydride or monoanhydride, cyclopentanetetracarboxylic acid dianhydride or monoanhydride, benzophenonetetracarboxylic acid dianhydride or monoanhydride, and mellitic acid trianhydride, dianhydride or monoanhydride. In view of the curing property and latent curing property, tricarboxylic acid anhydrides or tetracarboxylic acid anhydrides are preferably employed.

Most popular instances of the aliphatic tertiary amino alcohols are represented by the following general formula [VI]:

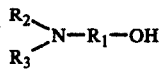

wherein $R_2$ and $R_3$ stand for alkyl groups having 1 to 20 carbon atoms, such as a methyl group, an ethyl group, a propyl group or the like, alkenyl groups having 1 to 20 carbon atoms, such as an allyl group or the like. The alkyl amino alcohols and alkenyl amino alcohols should preferably have molecular weights of 75 to about 400 and 80 to about 400, respectively. The alkyl or alkenyl group can be partially substituted by an aryl group such as a phenyl group or interposed by an aryl group such as a phenylene group. The alkyl or alkenyl group can also be partially substituted or interposed by an atom other than nitrogen or an atomic group, such as oxygen, chlorine, bromine, iodine, a hydroxyl group or the like, and $R_1$ stands for a divalent residue of a group such as exemplified above with respect to $R_2$ and $R_3$.

As specific examples of A-OH alcohols, there are dimethylaminoethanol, diethylaminoethanol, diisopropylaminoethanol, dibutylaminoethanol, dihexyaminoethanol, dimethylaminopropanol, diethylaminobutanol, N-methyldiethanol amine, N-ethyldiethanol amine, N-heptadecyldiethanol amine, triethanol amine, tripropanol amine and tributanol amine.

As examples of other A-OH alcohols represented by the formula [VI], there can be mentioned compounds in which $R_2$ and $R_3$ are bonded together through an atom other than nitrogen, for example, oxygen or an atomic group such as an alkylene group to form a ring. More specificially, there can be mentioned N-hydroxyethylmorpholine, N-hydroxypropylmorpholine and N-hydroxyethylpiperidine. As still other examples of A-OH alcohols, there can be mentioned compounds in which $R_1$, $R_2$ and $R_3$ are bonded together to form a ring in the above formula (5), such as N-methyl-2-hydroxyethylpiperidine, N-ethyl-3-hydroxypropylpiperidine, 2-hydroxypropylpyridine and 3-hydroxypropylpyridine.

Among the foregoing alcohols having an aliphatic tertiary amino group preferable are compounds in which the number of carbon atoms intervening between the nitrogen atom and the hydroxyl group is not larger than 5, because an intramolecular salt-forming reaction is readily caused in these compounds and they are excellent in the latent property.

As specific examples of compounds that can be used as the aliphatic tertiary amine (B') free of an alcoholic hydroxy group as in the formula [IV], there can be mentioned ordinary aliphatic tertiary amines, such as triethyl amine, tributyl amine, trihexyl amine, N-methylmorpholine, N-ethylmorpholine and N-methylpiperidine.

As a summary, preferable half-ester compounds contain at least one ester conjunction (ester group) terminated by an aliphatic tertiary amino group having 3 to about 60 carbon atoms and contain at least one carboxyl group forming an intramolecular salt with the amino group, the ester conjunction (ester group) and the carboxyl group being directly connected to a polyvalent group having 2 to about 20 carbon atoms, said polyvalent group having one or two carboxyl groups being direcetly connected thereto.

In the synthesis of compounds that are used in the present invention, the use of a solvent is not an indispensable condition, but when the synthesis is carried out in a solvent, the operation can be facilitated and a product uniform in characteristic properties can be obtained. As the solvent, there can be employed, for example, dioxane, methylethylketone, methylisobutylketone, cyclohexanone, dimethylformamide, dimethylacetamide and N-methylpyrrolidone.

Several examples of production of curing catalysts of the present invention will now be described.

PRODUCTION EXAMPLE 1

A 500 ml capacity, three-neck flask equipped with a reflux condenser having a drying tube, an agitator and a thermometer was charged with 21.8 g (0.1 mole) of pyromellitic anhydride, 150 ml of methylethylketone and 170 ml of dimethylformamide. The mixture in the flask was heated at 80° C to form a homogeneous solution. Then, 28.8 g (0.22 mole) of N-hydroxyethylmorpholine was added to the solution and heating was conducted for 2 hours. The reaction mixture was then cooled to room temperature and poured into 3 l of n-hexane to precipitate the reaction production, and the formed precipitate was recovered and dried at 140° C. under about 0.5 mm Hg for 16 hours by means of a vacuum oven to obtain 48.3 g of a solid product having a melting point of 190 to 195° C. When the product wa analyzed according to the infrared absorption spectrum analysis, an absorption not observed in the spectrum of the starting compounds was observed at 1720 $cm^{-1}$. Thus, formation of an ester group was confirmed. Results of the elementary analysis (each parethesized value is a theoretical value calculated as $C_{22}H_{28}N_2O_{10}$) are as follos: C = 54.96% (55.00%), H = 5.92% (5.87%), N = 5.89% (5.83%).

From the above analytic results, it was speculated that the main component of the obtained product was represented by the following formula:

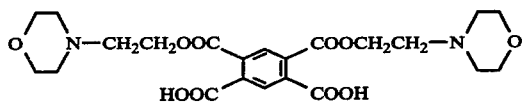

PRODUCTION EXAMPLE 2

A 500 ml capacity separable flask equipped with a reflux condenser having a drying tube, an agitator and a thermometer was charged with 38.4 g (0.2 mole) of trimellitic anhydride and 300 ml of dioxane; then the mixture was heated at 75° C. to form a homogeneous solution. Then, 39.2 g (0.44 mole) of demthylaminoethanol was added to the solution and reaction was conducted at 100 to 105° C. for 2 hours to obtain an oily product. The reaction mixture was cooled to room temperature and the solvent was removed by decantation. The residual highly viscous oily product was mixed with 100 ml of dioxane, and the mixture was heated at 100° C. The oily product of which the viscosity had thus been reduced was washed sufficiently. The oily product was thrown into an enamel-lined vat and cooled to room temperature, and the solvent was removed by decantation. The residual oily product was dried at 140° C. under 0.5 mm Hg by means of a vacuum oven until dioxane was not detected, to obtain 57.0 g of a solid having a melting point of 75 to 80° C. When the so recovered product was subjected to the infrared absorption spectrum analysis, an absorption not observed in the case of the starting compounds was observed at 1715 cm$^{-1}$. Thus, formation of an ester group was confirmed. Results of the elementary analysis are as follows: C = 55.03% (55.13%), H = 7.15% (7.07%), N = 7.91% (7.56%).

The so obtained product was a mixture of which main component is represented by the following formula:

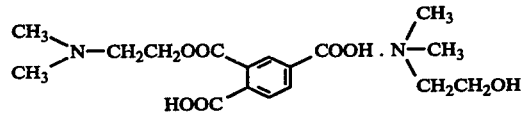

PRODUCTION EXAMPLE 3

The same reaction vessel as used in Production Example 2 was charged with 32.2 g (0.1 mole) of benzophenonetatracarboxylic acid dianhydride and 300 ml of dioxane; then the mixture was heated to form a solution. Then, 38.6 g (0.33 mole) of diethylaminoethanol and 1.8 g (0.1 mole) of water were added to the solution and reaction was carried out at 80° C. for 1 hour and at 100° C. for another 1 hour to obtain an oily product. In the same manner as described in Production Example 2, the oily product was washed and dried to obtain 52.9 g of a solid having a melting point of 115 to 120° C. When the product was subjected to the infrared absorption spectrum analysis, an absorption was observed at 1720 cm$^{-1}$ and formation of an ester group was confirmed. Results of the elementaty analysis of the product are as follows: C = 60.41% (60.62%), H = 6.82% (6.67%), N = 4.97% (4.88%).

The so obtained product was a mixture of which main component is represented by the following formula:

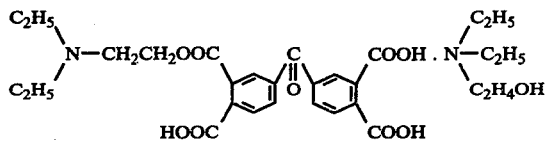

PRODUCTION EXAMPLE 4

The same reaction vessel as used in Production Example 1 was charged with 98.0 g (1.0 mole) of maleic anhydride and 300 ml of dioxane, and the mixture was heated to form a solution. Then, 97.9 g (1.1 mole) of dimethylaminoethanol was added to the solution and reaction was carried out at 100 to 105° C. for 2 hours. When the reaction mixture was cooled to room temperature,, a precipitate was formed. The solvent was removed by decantation and 100 ml of dioxane was added to the residual oil. The mixture was heated to form a solution and the solution was cooled to room temperature to cause reprecipitation. The solvent was removed by decantation and the residual precipitate was dried in the same manner as described in Production Example 2 to obtain 132 g of a solid having a melting point of 140 to 143° C. Formation of an ester group was confirmed by the infrared absorption spectrum analysis. Elementaty analysis values are as follows: C = 51.49% (51.33%), H = 6.87% (7.00%), N = 7.32% (7.48%).

The resulting product was a mixture of which main component is represented by the following formula:

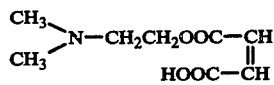

PRODUCTION EXAMPLE 5

The same reaction vessel as used in Production Example 2 was charged with 74 g (0.5 mole) of phthalic anhydride and 500 ml of dioxane, and the mixture was heated to form a solution. Then, 49 g (0.55 mole) of dimethylaminoethanol was added to the solution, and reaction was carried out at 100 to 105° C. for 2 hours. In the same manner as described in Production Example 2, the resulting solid was washed and dried to obtain 111 g of a solid having a melting point of 169 to 170° C. Formation of an ester group was confirmed by the infrared absorption spectrum analysis. Results of the elementary analysis of the product are as follows: C = 60.66% (60.75%), H = 6.51% (6.37%), N = 5.82% (5.90%).

The obtained product was a mixture of which main component is represented by the following formula:

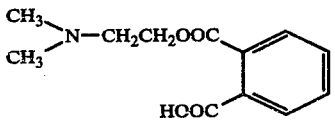

PRODUCTION EXAMPLE 6

The same reaction vessel as used in Production Example 2 was charged with 38.4 g (0.2 mole) of trimellitic anhydride, 17.8 g (0.2 mole) of dimethylaminoethanol and 53.9 g (0.2 mole) of trihexyl amine, and reaction was carried out at 100° C. for 40 minutes. The reaction product was dried at 140° C. under about 1 mm Hg for 8 hours to obtain 96 g of a solid having a melting point of about 40° C. Formation of an ester group was confirmed by the infrared absorption spectrum analysis. Elementary analysis values of the product are as follows: C = 68.01% (67.60%), H = 9.61% (9.88%), N = 5.14% (5.09%).

The so obtained product was a mixture of which main component is represented by the following formula:

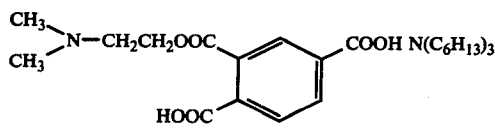

PRODUCTION EXAMPLE 7

According to the same synthetic method as described in Production Example 2, 2 moles of trimellitic anhydride was reacted with 1 mole of N-methyldiethanol amine and 2.1 moles of tributyl amine to obtain a mixture of half-esters whose main component is represented by the following formula:

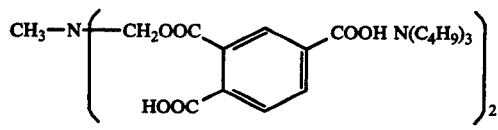

PRODUCTION EXAMPLE 8

According to the same synthetic method as described in Production Example 5, 1 mole of cyclopentanetetracarboxylic acid dianhydride was reacted with 2.2 moles of dimethylaminopropanol to obtain a mixture of half-esters whose main component is represented by the following formula:

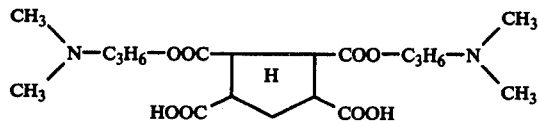

PRODUCTION EXAMPLE 9

According to the same synthetic method as described in Production Example 5, 1 mole of hexahydrophthalic acid anhydride was reacted with 1.2 moles of dimethylamino-1-phenylethanol to obtain a mixture of half-esters whose main component is represented by the following formula:

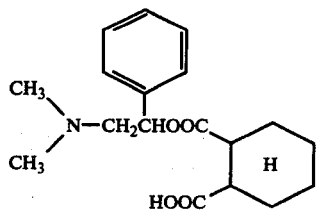

PRODUCTION EXAMPLE 10

According to the same synthetic method as described in Production Example 4, 1 mole of N-heptadecyldiethanol amine was reacted with 2 moles of succinic acid anhydride to obtain a mixture of half-esters whose main component is represented by the following formula:

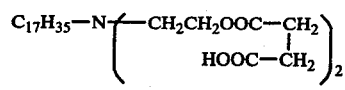

PRODUCTION EXAMPLE 11

According to the same synthetic method as described in Production Example 2, 1 mole of N-hydroxyethylpiperidine was reacted with 1 mole of trimellitic acid anhydride to obtain a mixture of half-esters whose main component is represented by the following formual:

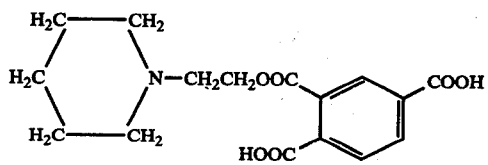

PRODUCTION EXAMPLE 12

According to the same synthetic method as described in Production Example 5, 1 mole of phthalic anhydride was reacted with 1 mole of 1-hydroxypropylpyridine to obtain a mixture of half-esters whose main component is represented by the following formula:

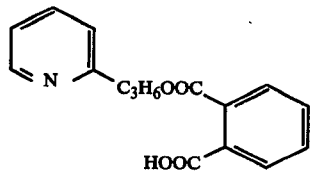

PRODUCTION EXAMPLE 13

According to the same synthetic method as described in Production Example 3, 2.2 moles of N-hydroxyisopropylmorpholine was reacted with 1 mole of mellitic acid trianhydride in the presence of 1 mole of water to obtain a mixture of half-esters whose main component is represented by the following formula:

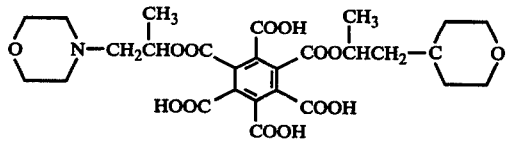

PRODUCTION EXAMPLE 14

According to the same synthetic method as described in Production Example 2, 5 moles of dimethylaminoethanol was reacted with 1 mole of mellitic acid trianhydride to obtain a mixture of half-esters whose main component is represented by the following formula:

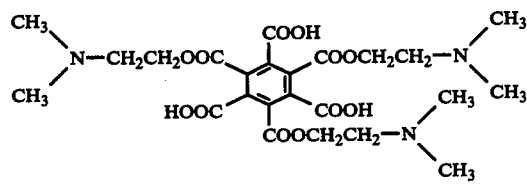

PRODUCTION EXAMPLE 15

According to the same synthesis method as described in Production Example 2, 3 moles of dimethylaminoethanol was reacted with 1 mole of benzophenonetetracarboxylic acid dianhydride to obtain a mixture of half-esters whose main component is represented by the following formula:

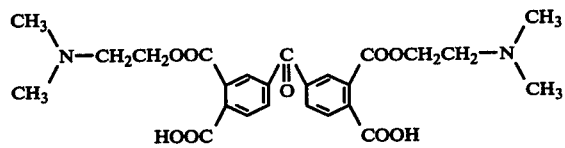

PRODUCTION EXAMPLE 16

Into a flask of 5 l equipped with an agitator, a dropping funnel, a thermometer, and a reflux condenser having a drying tube were charged 545 g (2.5 moles) of pyromellitic acid anhydride and 2.5 l of dimethylformamide. The charge was heated to 120° C to dissolve them.

When 490 g (5.5 moles) of dimethylaminoethanol charged in the funnel was added at 120° to 130° C to the solution, a white powder was precipitated. After the completion of the addition, the charge was kept at 130° C for 2 hours, and then it was cooled to room temperature. After the solvent was removed by filtering, the precipitate was dried at 140° C in a vacuum oven of 1 mm Hg to obtain 973 g (yield rate 98%) of a white powder.

According to an infrared spectroscopic analysis of the product, it was found that carboxyl groups of the anhydride disappeared and formation of ester groups was confirmed.

0.3 G. of the product was dissolved in 30 ml of water, and then titrated with an alcohol solution of 0.1 N KOH to determine an acid content (equivalent/kg). The content of free acid was 0.09 (theoretically zero), and the whole acid content was 5.02 (theoreticelly 5.05).

An element analysis of the product showed: C 54.30% (theoretically 54.55%), H 6.10% (6.06%), and N 7.03% (7.07%), and the melting point was 234° to 235° C.

The main component of the product is represented as follows:

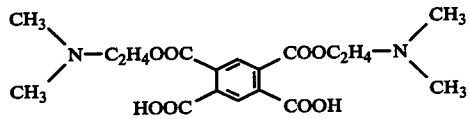

Use of the catalyst of the present invention as a catalyst for curing epoxy resins will now be described.

Epoxy resins to be cured by the catalyst of the present invention are not particularly critical, and a variety of known epoxy compounds which have normally been cured by tertiary amines can be cured by the catalyst disclosed by the present invention. As the epoxy resin, there can be mentioned, for example, glycidyl type epoxy resins (inclusive of methyglycidyl type epoxy resins) such as glycidyl ethers of phenols such as bisphenol A, bisphenol F, resorcinol, phenol novolac and cresol novolac, glycidyl ethers of alcohols such as butane diol, polyethlene glycol and polypropylene glycol, glycidyl esters of carboxylic acids such as phthalic acid, isophthalic acid and tetrahydrophthalic acid and products formed by substituting an active hydrogen atom bonded to the nitrogen atom of aniline, isocyanuric acid or the like with a glycidyl group; and so-called alicyclic epoxides formed by epoxidizing an olefin bond in the molecule by a peracid or the like, such as vinylcyclohexene diepoxide, 3, 4-epoxy-cyclohexylmethyl-3, 4-epoxycyclohexane carboxylate and 2-(3, 4-epoxy)-cyclohexyl-5, 5-spiro(3, 4-epoxy)-cyclohexane-m-dioxane.

When an epoxy resin is cured by using the curing catalyst of the present invention, a known curing agent for epoxy resins may be used in combination according to need. As such known curing agent, there can be mentioned, for example, so-called acid anhydride curing agents such as maleic acid anhydride, phthalic acid anhydride, tetrahydrophthalic acid anhydride, hexahydrophthalic acid anhydride, endomethylenetetrahydrophthalic acid anhydride, methylendomethylenetetrahydrophthalic acid anhydride, methyltetrahydrophthalic acid anhydride, tetrachlorophthalic acid anhydride, endodichloromethylenetetrachlorophthalic acid anhydride, tetrabromophthalic acid anhydride, trimellitic acid anhydride, cyclopentanetetracarboxylic acid dianhydride, benzophenonetetracarboxylic acid dianhydride and pyromellitic acid dianhydride, aromatic amines such as diaminodiphenylmethane, diaminodiphenyl ether, diaminodiphenylsulfone, benzidine, dianisidine, phenylene diamine, methylene-bis(o-chloroaniline), 3,3'-dicarboxylbenzidine and 3,3'-dicarboxydiaminodiphenylmethane; and so-called phenol type curing agents having polyhydric phenol type hydroxyl groups, such as phenol novolac, cresol novolac, condensation products of phenol and cresol with p-xylylene dimethoxide, and condensation products of phenol and cresol with diphenyl ether and formaldehyde. Still further, the present invention is applicable to a composition comprising an epoxy resin and an isocyanate which reacts with the epoxy resin to form an oxazolidone ring and which is trimerized to correslinked polymers in the presence of the half-ester compounds. Examples of isocyanates are tolylene diisocyanate, diphenylmethane diisocyanate, hydrogenated diphenylmethane diisocyanate, hexane-1, 6-diisocyanate, naphthalene diisocyanate, polymethylene polyphenylene polyisocyanate, and dimers and trimers of these isocyanates. Further, maleimides synthesized from an amine such as diaminodiphenylmethane or polymethylene polyphenylene polyamine and maleic acid anhydride are polymerized by themselves and amide-acids left in the molecule react with an epoxy resin to effect curing. Accordingly, they can be used as curing agents for epoxy resins. Still further, adducts formed from such maleimides and polyamines can be used as curing agents for epoxy resins. The thermosottable compositions comprising an epoxy resin and an isocyanate or a dimer or trimer of a polyisocyanate are known and are disclosed in such as U.S. Pat. No. 3,494,888.

The curing catalyst of the present invention has an excellent curing promoting activity even when incorporated in a small amount such as 0.05% by weight based on the epoxy resin in the system, and the amount used of the catalyst has, in general, no critical influence on the curing promoting activity. Sufficient results are obtained when the curing catalyst of the present invention is used in an amount of about 0.1% by weight or more, based on the weight of an epoxy resin used. Preferably, the half-ester compound is used in an amount of 0.5 to 5% by weight based on an epoxy resin. The amount of the catalyst is preferably controlled to about 15% by weight based on the epoxy resins in the composition from the economical reasons.

Since the curing catalyst of the present invention has a latent curing promoting property, it is stable at temperatures ranging from room temperature to 100° C. but at 9 higher temperature, especially at temperature higher than 150° C., it catalyzes the epoxy resins to effect a rapid curing of it. The epoxy resin system can be in the form of a powder or a liquid.

The present invention will now be described in detail by reference to the following Examples. It should be noted, however, that these Examples are not shown to limit the scope of the present invention, but are shown to illustrate the invention.

EXAMPLE 1 AND COMPARATIVE EXAMPLES 1 TO 4

In 100 parts by weight (all of "parts by" being by weight unless otherwise indicated) of a novolac type epoxy resin (ECN-1299 manufactured by Ciba Geigy Co.) was incorporated 70 parts of N,N-(4,4'-dimethyl-3,3'-diphenyldiisocyanate)-uretidine dione as a curing agent, and the mixture was further mixed with 3 parts of the compound obtained in Production Example 1 (Example 1), 1 part of N-hydroxyethylmorpholine (Comparative Example 1), 3 parts of N-hydroxyethylmorpholine pyromellitic acid complex (Comparative Example 2), 2 parts of 2-ethyl-4-methylimidazole trimellitic acid complex (Comparative Example 3) or 2 parts of 2-carboxypyridine (Comparative Example 4) as a curing catalyst. Each mixture was sufficiently blended and kneaded by means of a hot roll maintained at about 90° C. to form a resinous composition. Each of the so obtained resinous compositions was gelled in 30 to 40 seconds when heated at 150° C. The melt viscosity of each resinous composition was measured at 125° C. by using a Koka type flow tester. After each composition had been stored at 40° C., the melt viscosity was similarly measured. The storage period at which the melt viscosity was 2 times the initial value was determined and this period was defined as the shelf life. An MOS type semiconductor device having a partial gate was encapsulated with the resinous composition and the composition was cured at 170° C. for 16 hours. The leak current of the device was determined in the following manner.

A potential of −24 V was applied to the gate for 1 hour, and then, a potential of +12 V was applied between a source and a drain of the device. Just after application of this potential, the gate potential was released; then a current flowing between the source and drain was measured and defined as the leak current.

Results of the foregoing test are shown in Table 1.

Table 1

| Sample | Shelf Life (hours, 40° C.) | Latent Curing Promoting Index* (hours/sec) | Leak Current (μA, 125° C.) |
|---|---|---|---|
| Example 1 | 250 | 8.3 | 3 |
| Comparative Example 1 | 12 | 0.3 | 8 |
| Comparative Example 2 | 120 | 3.4 | 7 |
| Comparative Example 3 | 90 | 2.5 | 300 |
| Comparative Example 4 | 75 | 1.9 | 200 |

Note
*the latent curing promoting index is a value obtained by dividing the shelf life by the gelation time. The larger the latent curing promoting index, the better the latent curing characteristics of a catalyst.

EXAMPLE 2 AND COMPARATIVE EXAMPLES 5 TO 6

In 100 parts of an alicyclic epoxy resin (Chissonox 221 manufactured by Chisso Co.) was incorporated 120 parts of methyltetrahydrophthalic acid anhydride as the curing agent, and the mixture was further mixed with 1 part of the compound obtained in Production Example 3 (Example 2), 0.4 part of diethylaminoethanol (Comparative Example 5) or 1 part of 2-phenylimidazole trimellitic acid complex (Comparative Example 6) as the curing catalyst to form a thermosettable varnish. Each of the so prepared varnishes was gelled in 5 to 6 minutes when heated at 150° C. Each varnish was stored at 25° C. and the viscosity was measured, and the storage period at which the viscosity was 2 times the initial value was determined and defined as the shelf like of the varnish. Obtained results are shown in Table 2. The latent curing promoting index and leak current were determined in the same manners as described in Example 1.

Table 2

| Sample | Shelf Life (days, 25° C.) | Latent Curing Promoting Index (days/min) | Leak Current (μA, 125° C.) |
|---|---|---|---|
| Example 2 | 27 | 4.7 | 80 |
| Comparative Example 5 | 1 | 0.2 | 200 |
| Comparative Example 6 | 8 | 1.5 | 450 |

EXAMPLE 3 TO 9 AND COMPARATIVE EXAMPLES 7 TO 9

In 90 parts of a novolac type epoxy resin (ECN-1280 manufactured by Ciba Geigy Co.) were incorporated 10 parts of a brominated bisphenol A type epoxy resin (DER-542 manufactured by Dow Chemical Co.) and 45 parts of phenol type novolac (having a softening point of 90° C.), and the composition was further mixed with 3.5 parts of the compound obtained in Production Example 1 (Example 3), 1.7 parts of the compound obtained in Production Example 2 (Example 4), 2 parts of the compound obtained in Production Example 3 (Example 5), 1 part of the compound obtained in Production Example 4(Example 6), 1 part of the compound obtained in Production Example 5 (Example 7), 2 parts of the compound obtained in Production Example 6 (Example 8), 4 parts of the compound obtained in Production Example 7 (Example 9), 2 parts of 2-undecylimidazole trimellitic acid complex (Comparative Example 7), 3 parts of triethyl ammonium tetraphenyl borate (Comparative Example 8) or 0.7 part of diethylaminoethanol (Comparative Example 9) as the curing catalyst to obtain a heat-curable resinous composition. Each composition was gelled in 30 to 40 seconds at 170° C. The shelf life of each composition and leak current of a MOS device to which each of the compositions was applied were determined in the same manners as described in Example 1 to obtain results shown in Table 3.

Table 3

| Sample | Shelf Life (hours, 40° C.) | Latent Curing Promoting Index (hours/sec) | Leak Current ($\mu$A, 100° C.) |
| --- | --- | --- | --- |
| Example 3 | 320 | 8.6 | 1 |
| Example 4 | 160 | 5.1 | 5 |
| Example 5 | 230 | 6.4 | 1 |
| Example 6 | 55 | 1.7 | 9 |
| Example 7 | 45 | 1.5 | 7 |
| Example 8 | 150 | 4.6 | 7 |
| Example 9 | 180 | 5.3 | 4 |
| Comparative Example 7 | 110 | 3.1 | 400 |
| Comparative Example 8 | 140 | 3.6 | 40 |
| Comparaive Example 9 | 20 | 0.6 | 32 |

It is apparent from Table 3 that in Examples 3–9 very small leak currents were observed. It is seen from the results of Examples 6 and 7 in Table 3 that half-ester compounds obtained from dicarboxylic acids are not always satisfactory catalyst because the shelf lives of the compositions in Examples 6 and 7 are rather short while they gave considerably small leak current to MOS devices.

EXAMPLES 10 TO 15 AND COMPARATIVE EXAMPLE 10

A mixture comprising 100 parts of a bisphendol A type epoxy resin (DER-332 manufactured by Dow Chemical Co.) and 90 parts of a phenol-p-xylylene dimethoxide condensation product represented by the following formula:

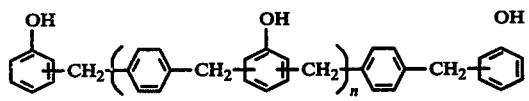

wherein n is 1.3 on the average, was mixed with 2 parts of the compound obtained in Production Example 8 (Example 10), 2 parts of the compound obtained in Production Example 9 (Example 11), 2 parts of the compound obtained in Production Example 10 (Example 12), 2 parts of the compound obtained in Production Example 11 (Example 13), 2 parts of the compound in Production Example 12 (Example 14 ), 2 parts of the compound obtained in Production Example 13 (Example 15) or 1 part of 2-heptadecylimidazole (Comparative Example 10) as the curing catalyst to form a thermosettable resinous composition. Each of the so prepared resinous compositions was gelled in 50 to 60 seconds at 150° C. The shelf life and leak current of each composition were determined in the same manners as described in Example 1 to obtain results shown in Table 4.

Table 4

| Sample | Shelf Life (hours, 40° C) | Latent Curing Promoting Index (hours/sec) | Leak Current ($\mu$A, 125° C.) |
| --- | --- | --- | --- |
| Example 10 | 210 | 3.8 | 7 |
| Example 11 | 42 | 0.8 | 45 |
| Example 12 | 60 | 1.1 | 15 |
| Example 13 | 140 | 2.6 | 12 |
| Example 14 | 50 | 0.9 | 35 |
| Example 15 | 240 | 4.3 | 2 |
| Comparative Example 10 | 15 | 0.3 | 250 |

It is seen from Table 4 that half-esters obtained from dicarboxylic acid anhydride which were used in Examples 11, 12 and 14 are not always suitable catalysts because shelf lives of the compositions containing them are not so long. Especially, the half-ester produced in Production Example 12 gave considerably large leak currents to MOS devices.

EXAMPLES 16 AND 17 AND COMPARATIVE EXAMPLES 11 AND 12

A mixture comprising 80 parts of novolac type epoxy resin (ECN-1299 manufactured by Ciba Geigy Co.) and 20 parts of tris-glycidyl isocyanurate was further mixed with 10 parts of the compound obtained in Production Example 14 (Example 16), 15 parts of the compound obtained in Production Example 15 (Example 17), 20 parts of 3,3'-dicarboxyldiaminodiphenylmethane (Comparative Example 11) or 5 parts of 2-heptadecylimidazole (Comparative Example 12) as the curing catalyst to form a resinous composition. Each resinous composition was gelled in 60 to 70 seconds at 180° C. The shelf life and leak current of each composition were determined in the same manners as described in Example 1 to obtain results shown in Table 5.

Table 5

| Sample | Shelf Life (hours, 60° C.) | Latent Curing Promoting Index (hours/sec) | Leak Current ($\mu$A, 100° C.) |
| --- | --- | --- | --- |
| Example 16 | 220 | 3.3 | 45 |
| Example 17 | 180 | 2.6 | 30 |
| Comparative Example 11 | 65 | 1.1 | 250 |
| Comparative Example 12 | 7 | 0.1 | 400 |

EXAMPLE 18

The same composition as in Examples 3–9 was prepared, except that the catalysts in those Examples were replaced by the compound obtained in Production Example 16. Shelf life, latent curing promoting index and leak current with respect to the composition were measured. Shelf life at 40° C was 340 hours, latent curing promoting index was 8.8h/sec, and leak current at 100° C was 2 $\mu$A, respectively.

Although the present invention has been described in detail by reference to the limited number of Examples, it is readily apparent to anyone skilled in the art that the present invention can be modified and utilized without departing from the spirit of the present invention defined in the accompanying claims. The present invention is applicable to molding or encapsulation of other electric or electronic devices or parts such as coils, coil windings of electrodynamo machines or transformers, capacitors, resistors, etc. The present invention is also applicable to such thermosettable compositions that are incorporated with various additives such as organic or inorganic fillers, glass fibers, etc.

What we claim is:

1. In the curing of epoxy resin systems which are normally catalyzed by tertiary amines, the improvement that comprises employing a latent curing catalyst comprising a half-ester compound which contains at least one ester group terminated by an aliphatic tertiary amino group and which contains at least one carboxyl group, with said at least one carboxyl group forming at least one intramolecular salt with said tertiary amino group, said at least one ester group and said at leat one carboxyl group being directly connected to an aliphatic or aromatic polyvalent group, the amount of said half-ester compound being about 0.05 to 15% by weight based on the epoxy resin.

2. In the curing of epoxy resin systems as defined in claim 1, wherein the half-ester compound contains ester groups terminated by aliphatic tertiary amino groups and contains carboxyl groups which form intramolecular salts with said tertiary amino groups, said ester group and said carboxyl groups being directly connected to an aliphatic or aromatic polyvalent group.

3. In the curing of epoxy resin systems as defined in claim 1, wherein the polyvalent group is a residue of a polycarboxylic acid anhydride which remains after removal of the carboxylic acid anhydride groups.

4. In the curing of epoxy resin systems as defined in claim 1, wherein the aliphatic tertiary amino group is a residue of tertiary amino alcohol which remains after removal of the hydroxy group.

5. In the curing of epoxy resin systems as defined in claim 2, wherein the polyvalent group is a residue of a polycarboxylic acid, which remains after removal of the carboxylic acid groups, of three or four valences.

6. In the curing of epoxy resin systems as defined in claim 2, wherein the polyvalent group is a residue of an aromatic or aliphatic polycarboxylic acid, which remains after removing the carboxylic acid groups, of three or four valences.

7. In the curing of epoxy resin systems as defined in claim 1, wherein the half-ester compound is a reaction product obtained by reacting a polycarboxylic acid anhydride with an aliphatic tertiary amino alcohol, which half-ester compound contains an ester group terminated by an aliphatic tertiary amino group of said alcohol and a carboxyl group of said acid anhydride, an intramolecular salt being formed by said amino group with said carboxyl group, said ester group and said carboxyl group being directly connected to a residue of said acid anhydride which remains after the removal of the carboxylic acid anhydride groups.

8. In the curing of epoxy resin systems as defined in claim 1, wherein the half-ester compound is a mixture whose main component is represented by the following general formula:

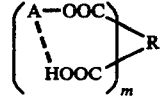

wherein R is an aliphatic or aromatic group of two to six valences, A is an aliphatic monovalent group containing an aliphatic tertiary amino group, and m is an integer of 1 to 3.

9. In the curing of epoxy resin systems as defined in claim 7, wherein the polycarboxylic acid anhydride is an aromatic acid anhydride and has a molecular weight of from 148 to about 400.

10. In the curing of epoxy resin systems as defined in claim 7, wherein the polycarboxylic acid anhydride is an aliphatic acid anhydride and has a molecular weight of from 61 to about 250.

11. In the curing of epoxy resin systems as defined in claim 7, wherein the aliphatic tertiary amino alcohol is an alkyl amino alcohol and has a molecular weight of from 75 to about 400.

12. In the curing of epoxy resin systems as defined in claim 7, wherein the aliphatic tertiary amino alcohol is an alkenyl amino alcohol and has a molecular weight of from 80 to about 400.

13. In the curing of epoxy resin systems as defined in claim 3, wherein the polycarboxylic acid anhydride is a member selected from the group consisting of pyromellitic acid dianhydride, trimellitic acid anhydride, benzophenone tetracarboxylic acid dianhydride, maleic acid anhydride, phthalic acid anhydride, cyclopentane tetracarboxylic acid dianhydride, hexahydrophthalic acid anhydride, succinic acid anhydride, and mellitic acid trianhydride.

14. In the curing of epoxy resin systems as defined in claim 4, wherein the amino alcohol is a member selected from the group consisting of N-hydroxyethyl morpholine, dimethylaminoethanol, diethylaminoethanol, N-methyldiethanolamine, dimethylaminopropanol, dimethylamino-1-phenylethanol, N-heptadecylethanolamine, N-hydroxypiperidine, 1-hydroxypropylpyridine, and N-hydroxyisopropylmorpholine.

15. In the curing of epoxy resin systems which are normally catalyzed by tertiary amines, the improvement that comprises employing a latent curing catalyst comprising a half-ester compound which contains at least one ester group terminated by an aliphatic tertiary amino group and which contains at least one carboxyl group, with said at least one carboxyl group forming at least one intramolecular salt with said tertiary amino group, and contains another carboxyl group which forms a salt with an aliphatic tertiary amine, said at least one ester group and said at least one carboxyl group forming said intramolecular salt being directly connected to an aliphatic or aromatic polyvalent group, the amount of said half-ester compound being about 0.05 to 15% by weight based on the epoxy resin.

16. In the curing of epoxy resin systems as defined in claim 15, wherein the half-ester compound is a mixture whose main component is represented by the following general formula:

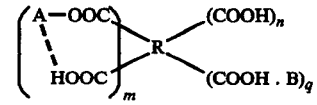

wherein R is an aliphatic or aromatic group of two to six valences, A is an aliphatic monovalent group containing an aliphatic tertiary amino group, B is an aliphatic tertiary amine, m is an integer of 1 to 3, and n and q are integers of zero to 4.

17. In the curing of epoxy resin systems as defined in claim 15, wherein the half-ester compound is a mixture whose main component is represented by the following general formula:

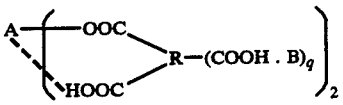

wherein R is an aliphatic or aromatic group of two to six valences, A is an aliphatic bivalent group containing an aliphatic tertiary amino group, B is an aliphatic tertiary amine, and q is an integer of zero to 4.

18. In the curing of epoxy resin systems as defined in claim 15, wherein the aliphatic or aromatic polyvalent group is a residue of a polycarboxylic acid anhydride, which residue remains after removal of the carboxylic acid anhydride groups, which anhydride is selected from the group consisting of pyromellitic acid dianhydride, trimellitic acid anhydride, benzophenone tetracarboxylic acid dianhydride, maleic acid anhydride, phthalic acid anhydride, cyclopentane tetracarboxylic acid dianhydride, hexahydrophthalic acid anhydride, succinic acid anhydride, and mellitic acid trianhydride.

19. In the curing of epoxy resin systems as defined in claim 15, wherein the aliphatic tertiary amino group is a residue of a tertiary amino alcohol selected from the group consisting of N-hydroxyethyl morpholine, dimethylaminoethanol, diethylaminoethanol, N-methyldiethanolamine, dimethylaminopropanol, N-hydroxypiperidine, 1-hydroxypropylpyridine, and N-hydroxyisopropylmorpholine.

20. In the curing of epoxy resin systems as defined in claim 2, wherein the half-ester compound is a reaction product of trimellitic acid anhydride with dimethylamino ethanol.

21. In the curing of epoxy resin systems as defined in claim 2, wherein the half-ester compound is a reaction product of benzophenone tetracarboxylic acid dianhydride with dimethyl aminoethanol.

22. In the curing of epoxy resin systems as defined in claim 2, wherein the half-ester compound is a reaction product of pyromellitic acid dianhydride with dimethyl aminoethanol.

23. In the curing of epoxy resin systems as defined in claim 15, wherein the tertiary amine is a member selected from the group consisting of trihexylamine and tributylamine.

24. In the curing of epoxy resin systems as defined in claim 16, wherein the tertiary amine is a member selected from the group consisting of trihexylamine and tributylamine.

25. In the curing of epoxy resin systems as defined in claim 1, wherein the half-ester compound contains at least one ester group terminated by an aliphatic tertiary amino group having 3 to 60 carbon atoms and contains at least one carboxyl group forming at least one intramolecular salt with said amino group, said at least one ester group and said at least one carboxyl group being directly connected to a polyvalent group having 2 to 20 carbon atoms, said polyvalent group having one or two free carboxyl groups being directly connected thereto.

26. The product by the process of claim 1.

27. The product produced by the process of claim 2.

28. The product produced by the process of claim 15.

29. In the curing of epoxy resin systems as defined in claim 1, wherein said at least one intramolecular salt, formed by said at least one carboxylic acid group with said tertiary amino group, is separable upon heating at a temperature higher than 100° C., whereby the half-ester acts as a latent curing catalyst.

30. In the curing of epoxy resin systems as defined in claim 15, wherein said at least one intramolecular salt, formed by said at least one carboxylic acid group with said tertiary amino group, is separable upon heating at a temperature higher than 100° C., whereby the half-ester acts as a latent curing catalyst.

31. A thermosettable resin system comprising an epoxy resin and the latent curing catalyst, said latent curing catalyst comprising a half-ester compound which contains at least one ester group-containing radical terminated by an aliphatic tertiary amino group and which contains at least one carboxyl group, with said at least one carboxyl group forming at least one intramolecular salt with said tertiary amino group, said at least one ester group-containing radical and said at least one carboxyl group being directly connected to an aliphatic or aromatic polyvalent group, the amount of said half-ester compound being about 0.05 to 15% by weight based on the epoxy resin in the system.

32. A thermosettable epoxy resin system as defined in claim 31, wherein the epoxy resin is a polyepoxide having in the molecule more than one vicinal epoxy group.

33. A thermosettable epoxy resin system as defined in claim 31, in the form of a stable liquid at room temperature, which is rapidly curved to a hard solid at a temperature over 100° C.

34. A thermosettable epoxy resin system as defined in claim 31, in the form of a powdered solid at room temperature, which fuses and cures to a hard continuous solid at a temperature over 100° C.

* * * * *